United States Patent [19]
Orlowski et al.

[11] Patent Number: 5,161,804
[45] Date of Patent: Nov. 10, 1992

[54] MAGNETIC SEAL

[75] Inventors: David C. Orlowski, Milan, Ill.; Heinz P. Bloch, Montgomery, Tex.

[73] Assignee: Inpro Companies, Inc., Rock Island, Ill.

[21] Appl. No.: 727,098

[22] Filed: Jul. 9, 1991

[51] Int. Cl.⁵ .............................. F16J 15/34
[52] U.S. Cl. ............................ 277/80; 277/81 R; 277/93 R
[58] Field of Search ............ 277/80, 81 R, 93 R, 277/93 SD

[56] References Cited

U.S. PATENT DOCUMENTS

| | | | |
|---|---|---|---|
| 2,843,403 | 7/1958 | Stevenson | 277/80 |
| 3,050,319 | 8/1962 | Colby | 277/80 X |
| 3,550,989 | 12/1970 | Hall | 277/93 R |
| 3,708,177 | 1/1973 | Baermann | 277/80 |
| 3,869,135 | 3/1975 | Diederich | 277/80 |
| 4,447,063 | 5/1984 | Kotzur et al. | 277/80 |
| 4,486,026 | 12/1984 | Furamura et al. | 277/80 |
| 4,605,234 | 8/1986 | Metcalf | 277/93 SD |
| 4,795,168 | 1/1989 | Adams et al. | 277/81 R X |

FOREIGN PATENT DOCUMENTS

| | | | |
|---|---|---|---|
| 1256549 | 12/1971 | United Kingdom | 277/80 |
| 2126670 | 3/1984 | United Kingdom | 277/80 |

Primary Examiner—William A. Cuchlinski, Jr.
Assistant Examiner—Scott W. Cummings
Attorney, Agent, or Firm—Rockey & Rifkin

[57] ABSTRACT

A magnetic seal for rotating shafts having a first and second annular members. Each of the annular members having a source of magnetic force with the lines of magnetic force being axially aligned with the shaft. A stationary insert positioned in said housing and having a sealing face adjacent the annular members. The first and second annular rings being rotatively connected with the second ring being sealed to the shaft and a face related to the second member for sealing contact with the face of the insert. The first of the rings secured to the shaft for annular rotation.

17 Claims, 3 Drawing Sheets

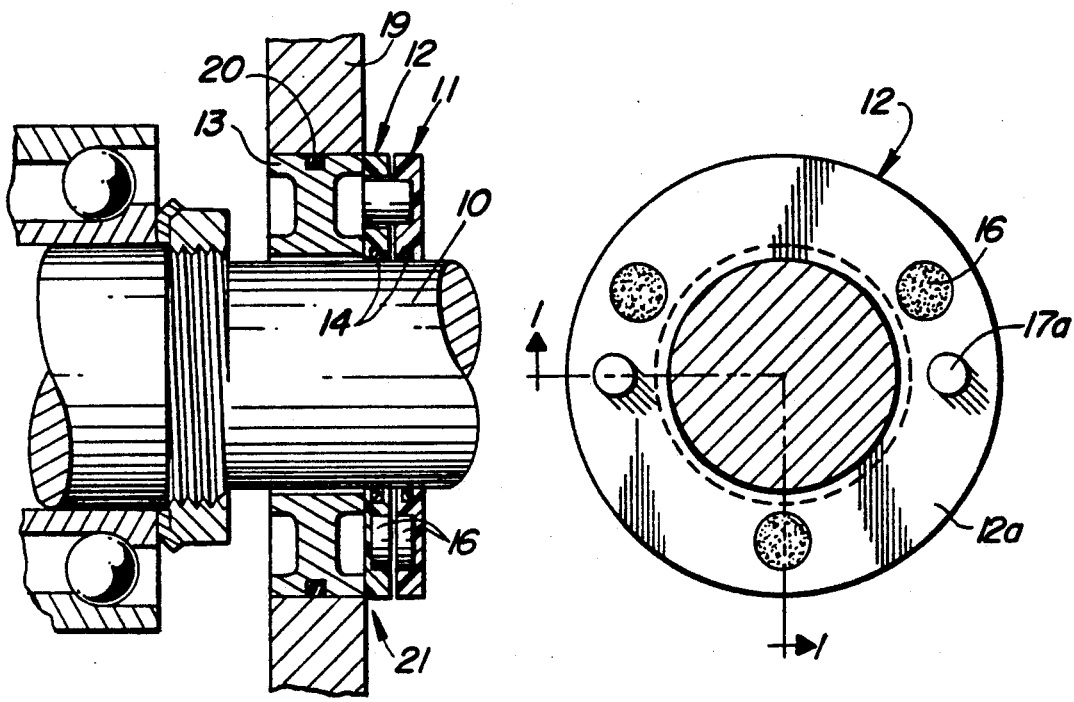
Fig. 1
Fig. 1a
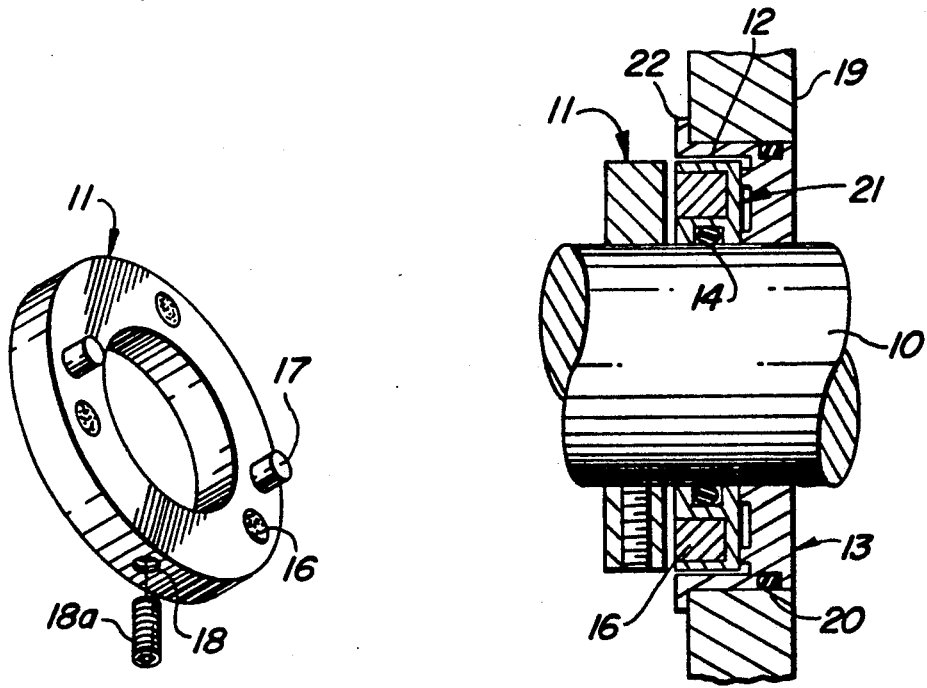
Fig. 1b
Fig. 2

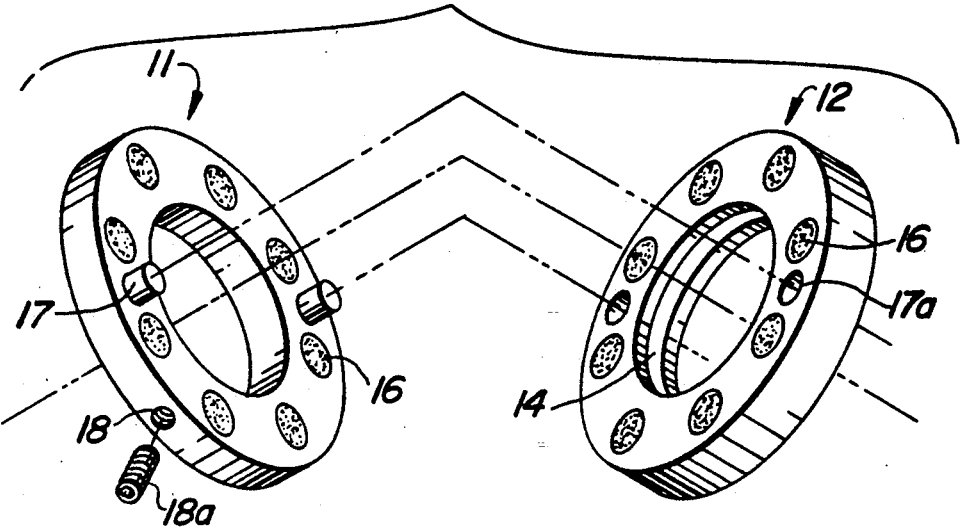
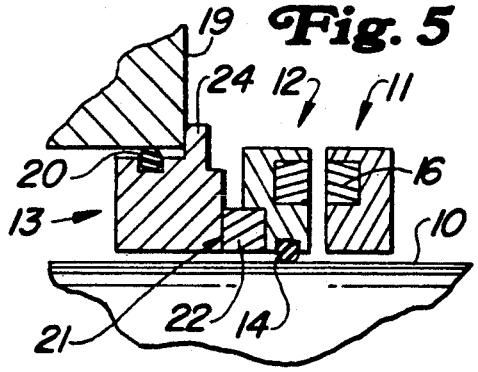
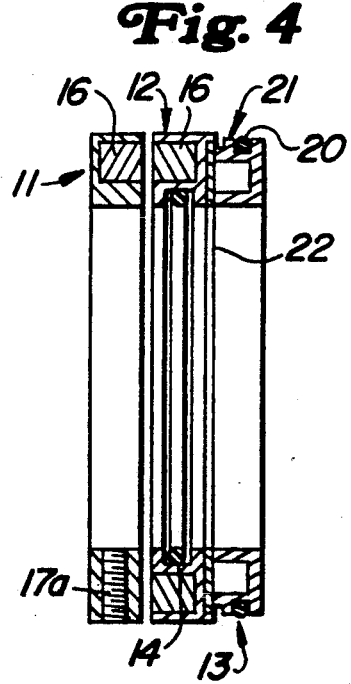
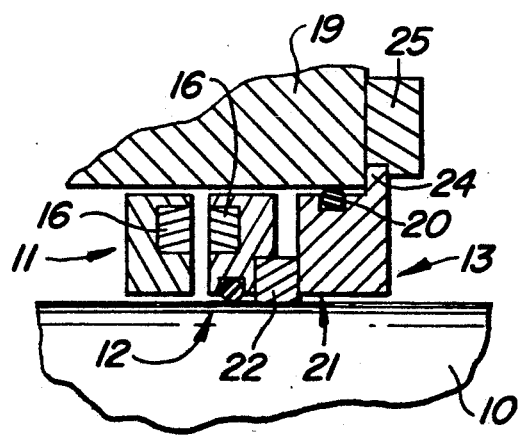

MAGNETIC SEAL

BACKGROUND OF THE INVENTION

For many years, hermetic sealing of enclosed bearing housings has been the goal for the efficient operation of rotating equipment. Minimum maintenance of rotating equipment is of increasing importance to operators because of the necessity to improve efficiency. Minimum maintenance is difficult to obtain because of the extreme equipment duty cycles, the lessening of service factors in design and the lack of spare rotating equipment in many processing plants.

Various forms of shaft sealing devices have been utilized to try to protect the integrity of the bearing environment including rubber lip seals, clearance labyrinth seals and attraction magnetic seals. Rubber lip seals were first utilized to connect the bearing frame to the rotatable shaft in an attempt to isolate the bearings from exterior contamination. Such lip seals are subject to premature wear and are short-lived. Lip seals also have been known to permit excessive amounts of moisture and other contaminants to become present in the oil reservoir of the bearing frame of the operating equipment.

Labyrinth-type seals involving closely related stator and rotor rings which do not contact each other, but define labyrinth passages between them, have been devised and utilized and are illustrated in U.S. Pat. No. 4,706,968. This type of seal also allowed a certain amount of axial separation of the fixed ring and the rotating ring to prevent contact and wear between sealing members and thus enhance the sealing characteristics. Labyrinth seals also allowed free transfer of humid vapors in and out of the bearing frame.

Mechanical shaft seals of the non-magnetic type have also been utilized as shaft sealing devices. This type of seal employs the use of metallic springs of the coil design or welded metal bellows design to effect the closure of the sealing faces. The metal springs of either design are subject to corrosion, fatigue, product fouling and stress over time and are linear in response to opening and closing of the sealing faces. This linear response does not adequately maintain the sealing surfaces as wear or corrosion continues to occur.

Attraction magnetic sealing systems have also been utilized as sealing devices. In this case, the attraction magnetic seal systems rely upon magnetic attraction to maintain face closure integrity and these seals are exemplified and described in U.S. Pat. No. 4,795,168 and the references cited therein. These attraction magnetic sealing systems are subject to exterior system forces that tend to separate the relatively rotating sealing faces. This works against the principle of magnetic attraction. When the sealing faces are separated, the forces of the magnetic field are weaker and the tendency for failure in operation by further separation and further weakening is pronounced. If there is wear between the sealing surfaces, then the magnetic forces are pulled closer together and the wear rate increases exponentially. This also increases the failure rate due to the increased torque required as the magnetic field increases. Magnetic or magnetized components of the attraction-type magnetic seals are typically attempted to be insulated from ferrous bearing housings to isolate the magnetic field from the bearings and/or housing. However, there are no true insulators against magnetism and the attempts to insulate the magnetic fields have greatly increased the structural complexity and cost without any benefits.

The present invention concerns the use of magnetic principles where the magnetic orientation is designed to seal by repelling one of the sealing components. The sealing interface is loaded with a controlled amount of axial force. The value of this axial force is determined by the axial proximity of the opposing magnets as well as the magnetic force of the opposing magnets. In addition, the magnetic flux lines are directed away from the sealing interface and do not have a tendency to magnetize a ferrous bearing housing. In this invention, a stationary sealer ring, i.e., the stator, functions as an insert in the bore of the bearing frame. The stator can be made from any material that is suitable for optimum sealing performance and yet does not have to be attractive to a magnetic force or be magnetized or be a magnet as is the case with the sealing faces of attraction magnetic sealing devices.

SUMMARY OF THE INVENTION

An object of this invention is to provide a seal around rotating shafts and their housings to prevent leakage of lubricant and the entry of contaminants by the use of a novel repelling magnetic sealing device.

Prior art seals of the magnetic type have depended upon magnetically attracted parts to obtain sealing. The rotating sealing faces of attractive magnetic parts or seals are dependant upon the attraction between two faces which are magnetized in opposite polarity so that the two faces will be attracted to each other.

This invention relates to an improved magnetic sealing device where the magnetic lines of force are designed to repel or propell the rotating part of the seal face against a fixed seal face. This will maintain the seal faces in contact with each other for the best sealing results.

This invention also provides a magnetic seal where the intensity of the magnetic force performing the sealing function can be varied by the addition of magnets in the rotating parts or by varying the magnetic strength of the magnets to increase the repelling magnetic forces. The desired magnetic force holding the sealing faces together can be modified or manually changed by moving one of the rotating parts along the axial direction of the shaft.

This invention is a magnetic seal made in three basic parts although the three parts may be expanded to four without violating the spirit of the invention. The first part is a rotating ring having a plurality of magnetic forces included therein wherein the magnetic forces have a north and south polarity directed axially. This first ring member also has a means for securing the ring member to the shaft.

There is a second rotating member similar in design to the first rotating member including a plurality of magnetic forces with the magnetic forces being opposed to the magnetic forces in the first member and aligned end to end with like magnetic poles aligned end to end so that the two ring members are repelled by each other. There are a plurality of drive pins that align and cause these rotors or rings to rotate together.

There is a third inert or stationary member which acts as an insert in the bore of the housing frame and has a sealing face thereon. The second ring or rotor will have a sealing face controlled by the magnetic repelling force between the first and the second sealing rings. This force is directed against the sealing face of the insert to insure the continuous sealing of the bearing by the sealing ring. The sealing face of the second ring may be a free-floating surface or be physically attached to the face of the second ring. In either case, the sealing face of the second ring is forced by the repelling force between the first and second ring against the sealing face of the stationary member.

BRIEF DESCRIPTION OF THE DRAWINGS

FIG. 1 is a sectional view showing the improved sealing structure with a shaft.

FIG. 1a is an end view of the second rotating ring of the present invention.

FIG. 1b is an end view of the first rotating ring of the present invention.

FIG. 2 is a sectional view showing another embodiment of the improved sealing structure.

FIG. 3 is an exploded perspective view of the two rotating rings of the improved sealing structure.

FIG. 4 is a sectional view showing another embodiment of the invention.

FIG. 5 is a sectional view showing yet another embodiment of the present invention.

FIG. 6 is a sectional view of the embodiment of the invention shown in FIG. 5 but utilized internally.

DETAILED DESCRIPTION OF A PREFERRED EMBODIMENT OF THE INVENTION

Figure 7:
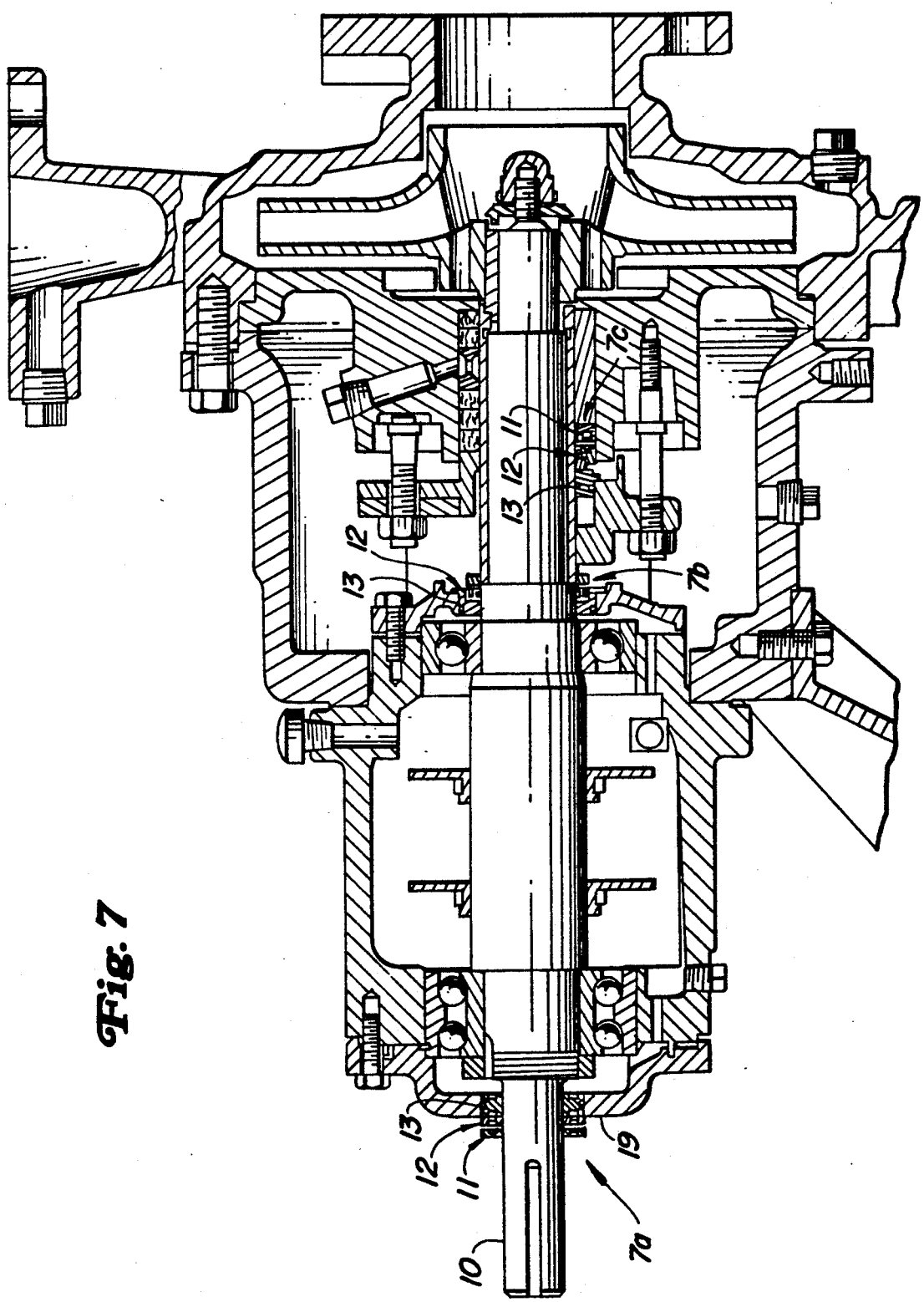
FIG. 7 is a sectional view of a pump showing various embodiments of the invention in place in the pump.

Referring first to FIG. 1, there is shown an early arrangement of the sealing structure of the present invention. The sealing rings of the present invention are shown mounted in vertical cross sections on shaft 10. The sealing rings are first ring 11 and the second ring 12. The shaft 10 is shown extending through the bearing housing 19 and includes the insert member 13. The first sealing member 11 is shown in greater detail in FIG. 1b and comprises the ring member or rotor 11a. This rotor and the rotor 12a should be made of non-magnetic, heat-conducting materials such as bronze, 300 series stainless steel or aluminum. However, in certain cases, chemically inert plastics, such as Teflon ®, may be used if conditions require or permit their use. Rotors 11 and 12 have inserted in each rotor magnetic forces 16, which comprise plug magnets in the preferred embodiment. These plug magnets are inserted so that the like polarities of the magnets face each other to repel the two rotors. There is also a means for securing the first rotor 11 to the shaft which is shown in FIG. 1b as the set screw 18a which screws into the threaded hole 18. This is only one method of securing the first ring to the shaft and other methods may be used which will still conform to the principles of the invention. Drive pins 17 in the first rotor fit into the holes 17a in the second rotor 12 to align the rotors and cause the rotors to rotate together. In FIG. 1 there are shown two sealing members 14 or O-rings to seal the rotors to the shaft. These sealing members 14 may be made of any normal conventional O-ring material. The drive pins 17 should also be made of heat conducting material so as to assist in carrying the frictional heat generated by the rotating sealing members away from the sealing members and dissipate the heat into the surrounding air or liquid.

FIG. 2 shows another embodiment of the invention wherein the first rotating member or rotor 11 is pinned to the shaft 10 in a conventional manner (not shown).

The sealing face 21 is now embedded in the insert member 13 rather than being flush with the exterior face of the housing member 19. In this case, there is no conventional O-ring associated with the first rotor because it has been found that such O-ring or sealing is not required with most embodiments of this invention. The pins and magnets are similar to those shown in FIGS. 1a and 1b and the operation of the embodiment is essentially similar. Flange members 22, which abut the housing member 19 to securely hold the insert from lateral or axial motion.

There is also in some embodiments an O-ring 20 or other sealing devices when required for proper sealing which provides a seal between the housing member 19 and the insert or stationary member 13. The sealing face in FIG. 2 is shown as 21, and comprises the same sealing face as in FIG. 1. The only difference is the configuration of the seal face which can be modified to meet various static and dynamic considerations in the required embodiment.

FIG. 3 is an exploded view showing rotors 11 and 12 having more plug magnets 16 than the embodiment shown in FIG. 1. These two rotors in FIG. 3 include the driving pins 17 and holes 17a in the second rotor. There is also provided means for securing the first rotor to the shaft similar to the means 18 and 18a described in FIG. 1. One way to increase the magnetic force between the two rotors and the repelling force is by increasing the number of magnets. This repelling force can also be increased by having magnets of larger diameter or possessing increased magnetic force. The positioning of the first rotor on the shaft determines the force depending on the strength of magnets of the second rotor against the sealing face of the stator. Thus, by changing the axial position of the first rotor on the shaft, it is possible to vary the sealing force between the second rotor face and the face of the insert member 13 or stator.

FIG. 4 shows another embodiment of this invention where the sealing face associated with the rotor is not attached to the rotor, but rather comprises a separate member 22. This member is forced by the same repelling magnetic force between rotors 11 and 12 to mate at the sealing face 21. The same magnets 16 and securing member 17a are shown as are the O-rings or sealing devices 20 and 14.

FIGS. 5 and 6 show another embodiment of the invention. In this embodiment, the rotors 11 and 12 are constructed similarly to those in FIG. 1, however, there is a new element 22 similar to the ring element 22 in FIG. 4 placed between the stator member 13 and the second rotor member 12. This element 22 may or may not be attached to the rotor 12, Preferably, it is not physically a part of rotor 12. This element 22, however, is forced against the sealing face of the stator 13 to form the seal at face 21. This configuration of member or element 22a can be modified as necessary to insure an adequate sealing face 21 between the stator 13 and the rotor 12.

In FIG. 5, the stator member 13 is external to the housing member 19 and is secured from lateral motion by the flange 24 which abuts against the housing member 19. All of the members as shown in FIG. 1 and described previously, such as the seals 14 and 20, the magnets 16 and the securing means 18, 18a, are present in the embodiment of FIGS. 5 and 6.

FIG. 6 shows the same embodiment of the invention as in FIG. 5 except that the sealing unit of this invention is internally mounted and runs inside the pump or housing rather than external to the housing as shown in FIG. 5. The same magnetic repelling forces act to force the second stator against member 22 to seal the stator 13 at sealing face 21. In this case, the flange 24 is used to prevent axial motion of the sealing unit of this invention and is assisted by a member 25 which may be a clamp to secure the sealing unit from movement in the axial direction.

As has been demonstrated, the present invention has many embodiments which will permit a plurality of uses including the use of this novel repelling magnetic sealing invention in pump stuffing boxes, sealing chambers to keep pump fluid from escaping along the shaft, and other instances where a differential pressure of fluid must be maintained. The seal components may be assembled in various configurations including right to left, left to right, inward to outward, etc. It is also possible to double or multiply these assemblies when conditions call for such configurations. It may also be desirable to encapsulate sealing member components and magnets against corrosive environments and thus insure longer life of the sealing unit. It is also possible to utilize this invention in the form of a cartridge wherein the seal assembly is mounted on a sleeve cartridge which will fit over the shaft and support the seal assembly.

FIG. 7 is illustrative of some of the many configurations described above. The first embodiment 7a is similar to that shown in FIG. 1. 7a is illustrated on the left side of FIG. 7 and includes the first and second rotors 11, 12 and the stator means 13. A second embodiment 7b, is similar to that shown in FIG. 4. 7a is illustrated in the middle of FIG. 7 and includes the first rotor 11 and second rotor 12 and the stator 13. The last embodiment 7c is similar to the embodiment shown in FIG. 6 and is illustrated on the right center. This embodiment also includes rotor 11, rotor 12 and stator 13 and face member 22.

Variations in other aspects of the preferred embodiment will occur to those versed in the art, all without departure from the spirit and scope of the invention.

What is claimed is:

1. A magnetic-type seal for sealing a rotating shaft exiting a housing comprising:
   a housing;
   a shaft extending through said housing;
   a first annular member surrounding said shaft including a source of magnetic force secured therein with the magnetic force applied axially, means for securing said first annular member to said shaft;
   a second annular member surrounding said shaft including a source of magnetic force secured therein with the magnetic force being of like polarity to said magnetic force in said first annular member and applied axially to repel said annular members, means for sealing said second annular member around said shaft;
   a sealing face surrounding said shaft on the side of said second annular member opposite from said first annular member;
   drive means for rotatively connecting said first and second annular members;
   a stationary insert positioned in said housing surrounding said shaft and sealed to said housing, said insert having a face perpendicular to said shaft and aligned with said sealing face and said second annular member, said repelling magnetic forces forcing said sealing face into compressive contact with said face on said stationary insert to seal said housing.

2. A magnetic seal according to claim 1 wherein said sealing face is fixed to said second annular member.

3. The magnetic seal according to claim 2 wherein said first annular ring is formed from non-magnetic material.

4. The magnetic seal according to claim 3 wherein said first annular ring is formed from non-ferrous metal.

5. The magnetic seal according to claim 4 wherein said first annular ring includes a recessed area with said magnetic source secured in said recess.

6. The magnetic seal according to claim 5 wherein said magnetic source is a plurality of plug magnets.

7. The magnetic seal according to claim 1 wherein said second annular ring is formed of non-magnetic material.

8. The magnetic seal according to claim 7 wherein said second annular ring is a non-ferrous metal.

9. The magnetic seal according to claim 8 wherein said second annular ring has a recessed area wherein said source of magnetic force is secured.

10. The magnetic seal according to claim 9 wherein said source of magnetic force is a plurality of plug magnets.

11. The magnetic seal as in claim 1 wherein said sealing faces comprise smooth, flat, mating, non-magnetic surfaces.

12. The magnetic seal according to claim 1 wherein said means for sealing said second annular member around said shaft is an elastomeric member.

13. The magnetic seal according to claim 1 wherein said drive means is a plurality of pins engaging said first and second annular rings.

14. The magnetic seal as in claim 1 wherein said insert is formed from non-magnetic material.

15. The magnetic seal according to claim 1 wherein said means for securing said first annular member to said shaft includes means for adjusting the axial position of said first annular member on said shaft.

16. The magnetic seal according to claim 1 wherein the compressive sealing force is varied by the axial position of the first annular member on said shaft relative to said second annular member.

17. The magnetic seal according to claim 1 wherein the magnetic force of the repelling magnets controls the compressive sealing force.

* * * * *